United States Patent
Sawada et al.

(10) Patent No.: US 8,434,316 B2
(45) Date of Patent: May 7, 2013

(54) COMPRESSOR INLET PRESSURE ESTIMATION APPARATUS FOR REFRIGERATION CYCLE SYSTEM

(75) Inventors: Yoshikatsu Sawada, Kariya (JP); Yasutane Hijikata, Nagoya (JP)

(73) Assignee: DENSO CORPORATION, Kariya (JP)

( * ) Notice: Subject to any disclaimer, the term of this patent is extended or adjusted under 35 U.S.C. 154(b) by 923 days.

(21) Appl. No.: 12/153,709

(22) Filed: May 22, 2008

(65) Prior Publication Data
US 2008/0295530 A1 Dec. 4, 2008

(30) Foreign Application Priority Data
May 28, 2007 (JP) ................. 2007-140321

(51) Int. Cl.
*G01K 13/00* (2006.01)

(52) U.S. Cl.
USPC .......... 62/129; 62/127; 62/157; 62/158; 62/178; 62/180; 62/228.1; 62/228.3; 62/228.4; 62/228.5; 62/231; 702/1; 702/33; 702/34; 702/41; 702/127; 702/130; 702/182; 702/187; 702/189; 374/141; 374/143; 374/134; 374/147

(58) Field of Classification Search .......... 62/127, 62/129, 157, 158, 178, 180, 228.1, 228.3–228.5, 62/231; 702/1, 33, 34, 41, 44, 127, 130, 702/182, 187, 189; 700/299, 300; 374/141, 374/143, 16, 147, 33, 134
See application file for complete search history.

(56) References Cited

U.S. PATENT DOCUMENTS

| | | | | |
|---|---|---|---|---|
| 3,924,417 | A | * | 12/1975 | Heidorn .................... 62/158 |
| 4,848,101 | A | * | 7/1989 | Suzuki .................... 62/228.5 |
| 4,909,043 | A | * | 3/1990 | Masauji et al. .............. 62/158 |
| 5,902,346 | A | * | 5/1999 | Cullen et al. ............... 701/102 |
| 6,237,681 | B1 | | 5/2001 | Takano et al. |

(Continued)

FOREIGN PATENT DOCUMENTS

| | | |
|---|---|---|
| JP | A-61-091706 | 5/1986 |
| JP | A-04-329408 | 11/1992 |

(Continued)

OTHER PUBLICATIONS

Office Action dated Mar. 3, 2009 issued from the Japan Patent Office for corresponding Japanese patent application No. 2007-140321 (English translation enclosed).

(Continued)

*Primary Examiner* — Frantz Jules
*Assistant Examiner* — Azim Abdur Rahim
(74) *Attorney, Agent, or Firm* — Posz Law Group, PLC (57) ABSTRACT

A compressor inlet pressure estimation apparatus for a refrigeration cycle system is disclosed. An electronic control unit 14 answers YES by judging that the command to start a compressor 2 is issued when an air-conditioning switch is turned on in step S100. After that, the electronic control unit 14 answers NO in the case where a timer count time Tc is shorter than a predetermined time T1 in step S120. At the same time, Tefin_C is set to 15° C. in step S130. The lower one of Tefin_C and Tefin determined in this way is determined as Tefin_d (step S150). After that, Tefin_d is input to the first-order lag function to acquire Tefin_AD(N). Then, the control proceeds to step S170, where the estimated value Ps_es(N) of the refrigerant inlet pressure of the compressor 2 is determined using Tefin_AD(N) and Gr.

11 Claims, 6 Drawing Sheets

U.S. PATENT DOCUMENTS

| | | | |
|---|---|---|---|
| 7,392,659 B2 * | 7/2008 | Hong et al. | 62/115 |
| 2003/0213256 A1 * | 11/2003 | Ueda et al. | 62/230 |
| 2004/0089004 A1 * | 5/2004 | Ogiso et al. | 62/203 |
| 2005/0251293 A1 * | 11/2005 | Seigel | 700/276 |

FOREIGN PATENT DOCUMENTS

| | | |
|---|---|---|
| JP | A-10-153353 | 6/1998 |
| JP | A-2000-142094 | 5/2000 |
| JP | A-2005-009794 | 1/2005 |
| JP | A-2005-282972 | 10/2005 |
| JP | 2006250440 A * | 9/2006 |
| JP | A-2007-140320 | 5/2007 |

OTHER PUBLICATIONS

U.S. Appl. No. 12/153,710, May 22, 2008, Sawada et al.

* cited by examiner

COMPRESSOR INLET PRESSURE ESTIMATION APPARATUS FOR REFRIGERATION CYCLE SYSTEM

CROSS REFERENCE TO RELATED APPLICATIONS

This application is based on Japanese Patent Application No. 2007-140321 filed on May 28, 2007, the disclosure of which is incorporated herein by reference. This application is also related to U.S. application Ser. No. 12/53,710, entitled "COMPRESSOR INLET PRESSURE ESTIMATION APPARATUS FOR REFRIGERATION CYCLE SYSTEM," filed simultaneously on May 22, 2008 with the present application.

BACKGROUND OF THE INVENTION

1. Field of the Invention

This invention relates to an apparatus for estimating the inlet pressure of the compressor of a refrigeration cycle system.

2. Description of the Related Art

In the prior art, an automotive refrigeration cycle system including a compressor driven by a vehicle engine for compressing a refrigerant, a cooler for cooling a high-temperature high-pressure refrigerant discharged from the compressor, a decompressor for reducing the pressure of the refrigerant cooled by the cooler and an evaporator for evaporating the refrigerant reduced in pressure by the decompressor has been proposed (for example, Japanese Unexamined Patent Publication No. 2000-142094).

This conventional automotive refrigeration cycle system further includes a blower for blowing air toward the evaporator, in which the refrigerant is evaporated by absorbing heat from air sent from the blower. As a result, air sent from the blower is cooled by the refrigerant in the evaporator.

SUMMARY OF THE INVENTION

Since the refrigerant is in a gas-liquid phase, and therefore the refrigerant temperature and refrigerant pressure are specified in one-to-one relationship in the evaporator of the automotive refrigeration cycle system, the present inventor has studied the possibility of estimating the refrigerant pressure in the evaporator and hence the inlet pressure of the compressor based on the detection value of a thermistor for detecting the temperature of air blown out from the evaporator.

Figure 6:
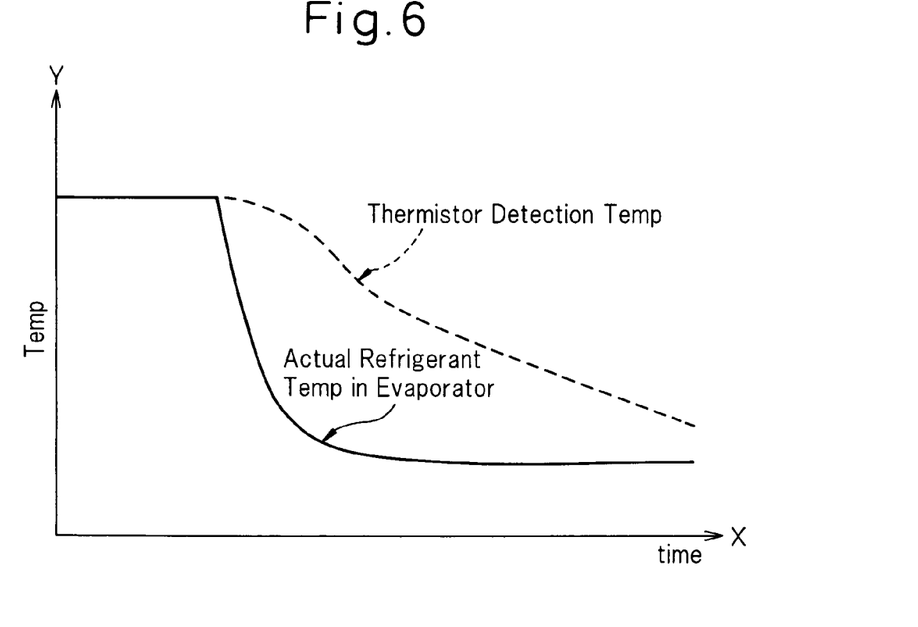
FIG. 6 is a diagram showing the time lag of the detection temperature of a thermistor with respect to the actual refrigerant temperature in the evaporator.

The inventor has determined that the detection value of the thermistor lags (response lag) behind the actual refrigerant temperature, as shown in FIG. 6, in the transient state in which the refrigerant temperature in the evaporator sharply drops after starting the compressor. This lag is attributable to the heat capacity of the evaporator and the thermistor.

Figure 7:
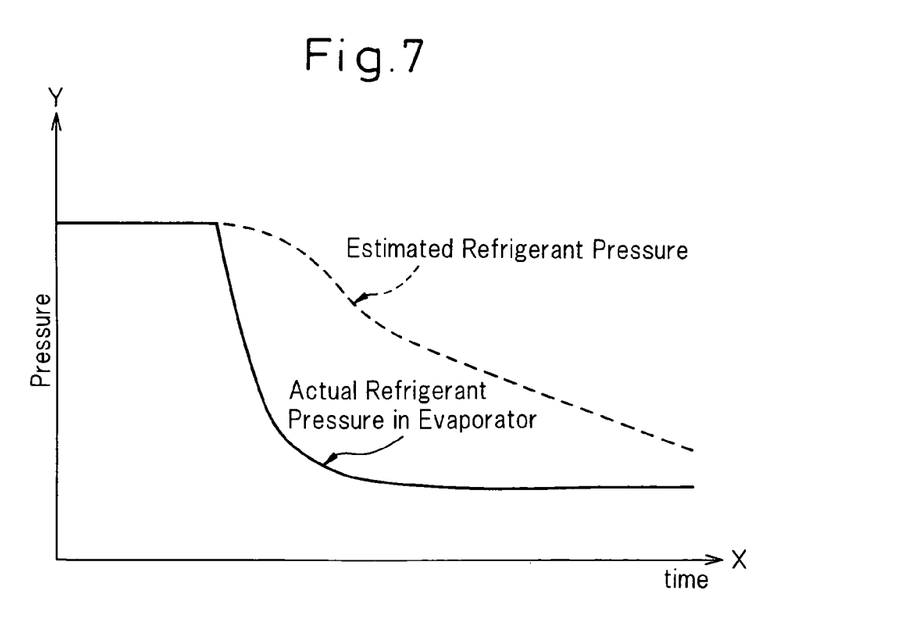
FIG. 7 is a diagram showing the time lag of the estimated refrigerant pressure with respect to the actual refrigerant pressure in the evaporator.

Even in the case where the refrigerant pressure in the evaporator is estimated based on the detection value of the thermistor, the estimation value would lag behind the actual refrigerant pressure as shown in FIG. 7. In other words, the refrigerant pressure in the evaporator and hence the inlet pressure of the compressor could not be accurately estimated.

The object of this invention is to provide a compressor inlet pressure estimation apparatus for the refrigeration cycle system which can accurately estimate the inlet pressure of the compressor.

This invention has been achieved by taking into account the actual refrigerant temperature in the evaporator, as shown in FIG. 6, has a downwardly convex characteristic curve in the X-Y coordinate system with Y axis representing the refrigerant temperature in the evaporator and X axis representing the time.

Specifically, according to one aspect of this invention, there is provided a compressor inlet pressure estimation apparatus for the refrigeration cycle system, comprising:

a compressor (2) for sucking, compressing and discharging the refrigerant;

a temperature sensor (13) for detecting the surface temperature of an evaporator (6) making up the refrigeration cycle system with the compressor (2);

a refrigerant temperature estimation means for estimating the refrigerant temperature in the evaporator based on the function set according to the detection temperature of the temperature sensor; and a pressure estimation means for estimating the refrigerant inlet pressure of the compressor based on the refrigerant temperature estimated by the refrigerant temperature estimation means;

wherein the function connects, with a downwardly convex curve, the surface temperature of the evaporator (6) detected by the temperature sensor (13) at the time of starting the compressor and an estimated target temperature (Tefin_C) constituting the refrigerant temperature upon lapse of a predetermined time (Ts) after starting the compressor, in the X-Y coordinate system with Y axis representing the refrigerant temperature and X axis representing the time.

With this configuration, the refrigerant temperature in the evaporator can be accurately estimated, as well as the inlet pressure of the compressor.

According to another aspect of the invention, there is provided a compressor inlet pressure estimation apparatus, wherein the function is set in such a manner that the estimated target temperature (Tefin_C) is increased with the lapse of a predetermined time period (T1) after starting the compressor.

Figure 5:
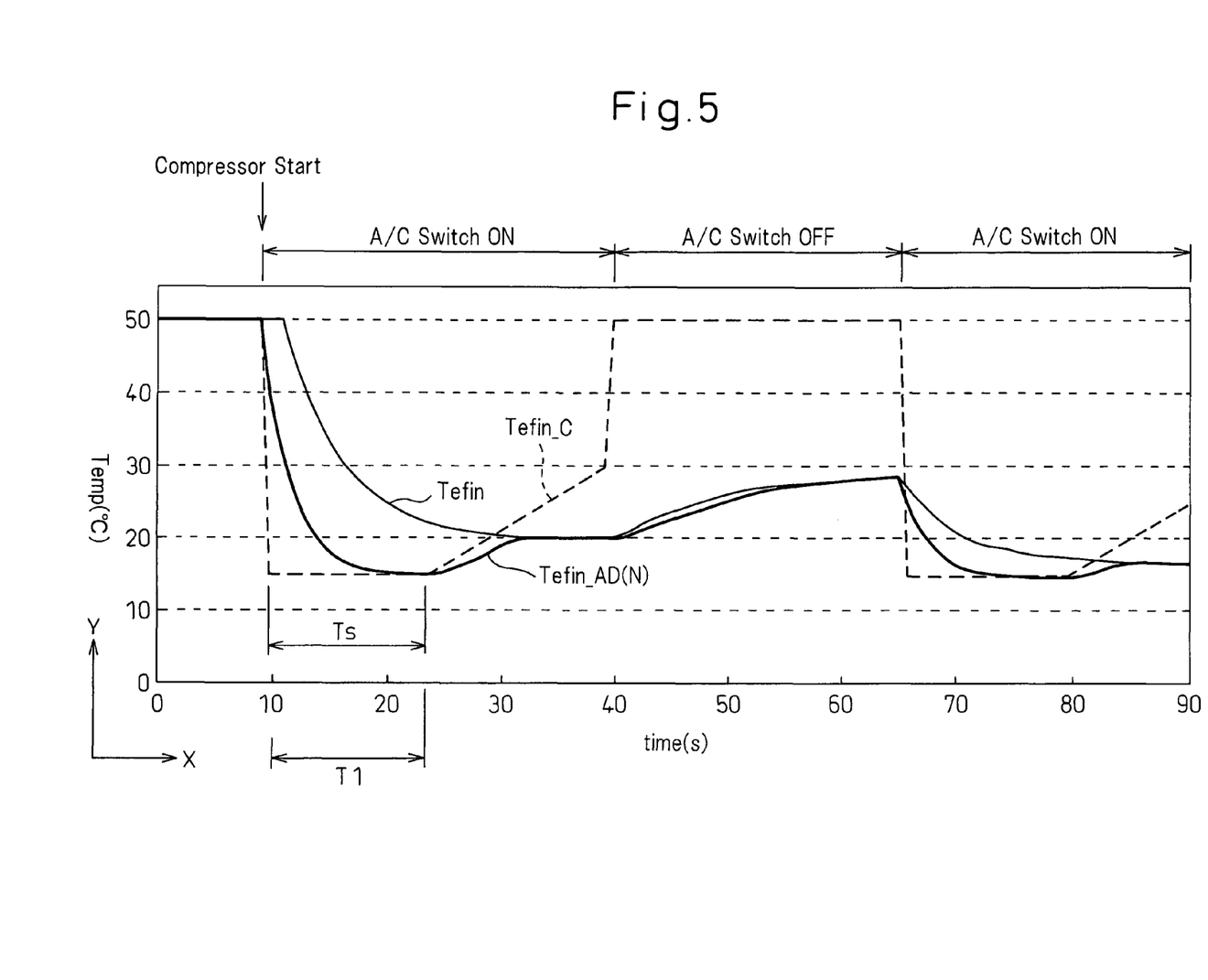
FIG. 5 is a diagram showing a specific example of the behavior of Tefin_AD(N), Tefin_C and Tefin according to the same embodiment.

In the case where the detection temperature of the temperature sensor is higher than the estimated target temperature (Tefin_C) even upon lapse of a predetermined time period (T1) or longer after starting the compressor as shown in FIG. 5, for example, the estimated temperature estimated using the function is made to approach the detection temperature.

Specifically, even in the case where the detection temperature of the temperature sensor is higher than the estimated target temperature (Tefin_C) upon lapse of the predetermined time period (T1) or longer after starting the compressor, the inlet pressure of the compressor can be estimated using the estimated temperature proximate to the detection temperature.

According to still another aspect of the invention, there is provided a compressor inlet pressure estimation apparatus comprising a refrigerant flow rate sensor (35) for detecting the flow rate of the refrigerant flowing between the evaporator and the compressor, wherein the pressure estimation means estimates the refrigerant pressure in the evaporator based on the refrigerant temperature estimated by the refrigerant temperature estimation means, estimates the pressure loss between the evaporator and the compressor based on the flow rate detected by the refrigerant flow rate sensor, and estimates the refrigerant inlet pressure of the compressor by subtracting the estimated pressure loss from the estimated refrigerant pressure in the evaporator.

In this way, the refrigerant inlet pressure can be estimated with a higher accuracy by determining the refrigerant inlet pressure of the compressor from which the pressure loss is subtracted.

Incidentally, the reference numerals inserted in the parentheses following the names of the respective means described in the scope of claims and above, represent the correspondence with the specific means described later in with reference to embodiments.

The present invention may be more fully understood from the description of preferred embodiments of the invention, as set forth below, together with the accompanying drawings.

DESCRIPTION OF THE PREFERRED EMBODIMENTS

Figure 1:
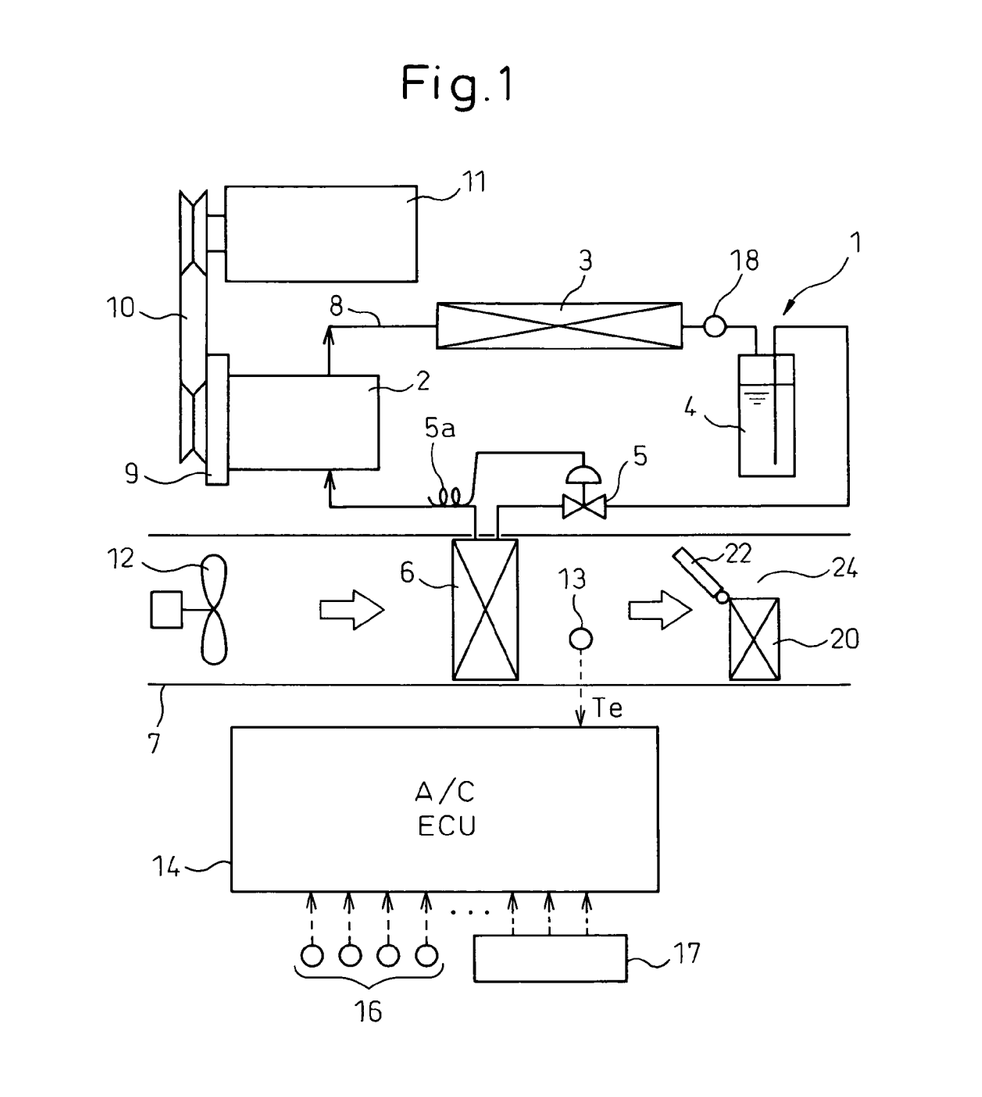
FIG. 1 is a diagram showing the general configuration of a refrigeration cycle system of a air conditioning system for an automotive vehicle according to an embodiment of the invention.

An embodiment of the invention will be explained with reference to the drawings. FIG. 1 is a diagram showing the general configuration of a refrigeration cycle system of an automotive air conditioning system according to an embodiment of the invention. The refrigeration cycle system 1 includes a compressor 2 for sucking, compressing and discharging the refrigerant.

The compressor 2 is a variable displacement compressor driven by a vehicle engine 11 through an electromagnetic clutch 9, a belt 10, etc.

The gas refrigerant high in temperature and pressure discharged from the compressor 2 flows into a condenser (cooler) 3, which in turn cools the gas refrigerant with the external air blown in by a cooling fan (not shown). The refrigerant condensed by the condenser 3 flows into a liquid receiver (gas-liquid separator) 4, which stores the extraneous refrigerant (liquid-phase refrigerant) by separating the gas refrigerant and the liquid refrigerant from each other. The liquid refrigerant from the liquid receiver 4 is reduced to a low pressure by an expansion valve 5.

The low-pressure refrigerant from the expansion valve 5 flows into an evaporator 6. The evaporator 6 is arranged in an air-conditioning case 7 making up an air path of the automotive air conditioning system. The low-pressure refrigerant that has flowed into the evaporator 6 is evaporated by absorbing heat from the air blown from an electrically-operated blower 12. The expansion valve 5 is a temperature-type expansion valve having a temperature sensing unit 5a for sensing the temperature of the outlet refrigerant of the evaporator 6 and adjusts the valve opening degree (refrigerant flow rate) in such a manner as to maintain a predetermined value of the degree of superheat of the outlet refrigerant of the evaporator 6.

The parts (1 to 6) making up the refrigeration cycle system described above are coupled to each other by a refrigerant pipe 8 and make up a closed circuit.

The blower 12 is arranged in the air-conditioning case 7, and the air (internal air) in the passenger compartment or the air (external air) outside the passenger compartment introduced from a well-known internal/external air switching box (not shown) is blown into the passenger compartment through the air-conditioning case 7 by the blower 12. A temperature sensor 13 including a thermistor for detecting the temperature of the blown air immediately after passing through the evaporator 6 is arranged at the part immediately following the air blowout of the evaporator 6 in the air-conditioning case 7.

According to this embodiment, the temperature sensor 13 is used for detecting the surface temperature of the evaporator 6.

A heater unit 20 is arranged on the downstream side of the evaporator 6. In the heater unit 20, the air cooled by the evaporator 6 is heated by the engine cooling water (warm water). A bypass 24 for passing the cool air blown from the evaporator 6 is arranged on the side of the heater unit 20, and an air mix door 22 is arranged on the upstream side of the heater unit 20.

The air mix door 22 regulates the temperature of the air blown into the compartment, by adjusting the ratio between the quantity of the air flowing into the heater unit 20 and the quantity of the air flowing into the bypass 24. The air mix door 22 is driven by a servo motor (not shown).

An electronic control unit 14 for the air-conditioning system (A/C ECU) is supplied with the detection signals of sensors 16 for automatically controlling the climate in the passenger compartment and the operation signals of the operating switches of an air-conditioning operation panel 17. The electronic control unit 14, together with the temperature sensor 13 and a flow rate sensor 35 described later, makes up a "compressor inlet pressure estimation apparatus for the refrigeration cycle system" described in the appended claims.

The sensor group 16 specifically includes an internal air sensor, an external air sensor, a sunlight sensor and an engine water temperature sensor, while the operating switches on the air-conditioning operation panel 17 specifically include a temperature setting switch, an air capacity setting switch and an air-conditioning switch for issuing a start command to the compressor 2.

The electronic control unit 14 for the air-conditioning system is supplied with the detection signal of a high-pressure sensor 18. The high-pressure sensor 18 detects the refrigerant pressure on high-pressure side between the refrigerant outlet of the compressor 2 and the refrigerant inlet of the expansion valve 5 in the refrigeration cycle system 1. In the shown case, the high-pressure sensor 18 is arranged in the refrigerant pipe on the outlet side of the condenser 3.

Figure 2:
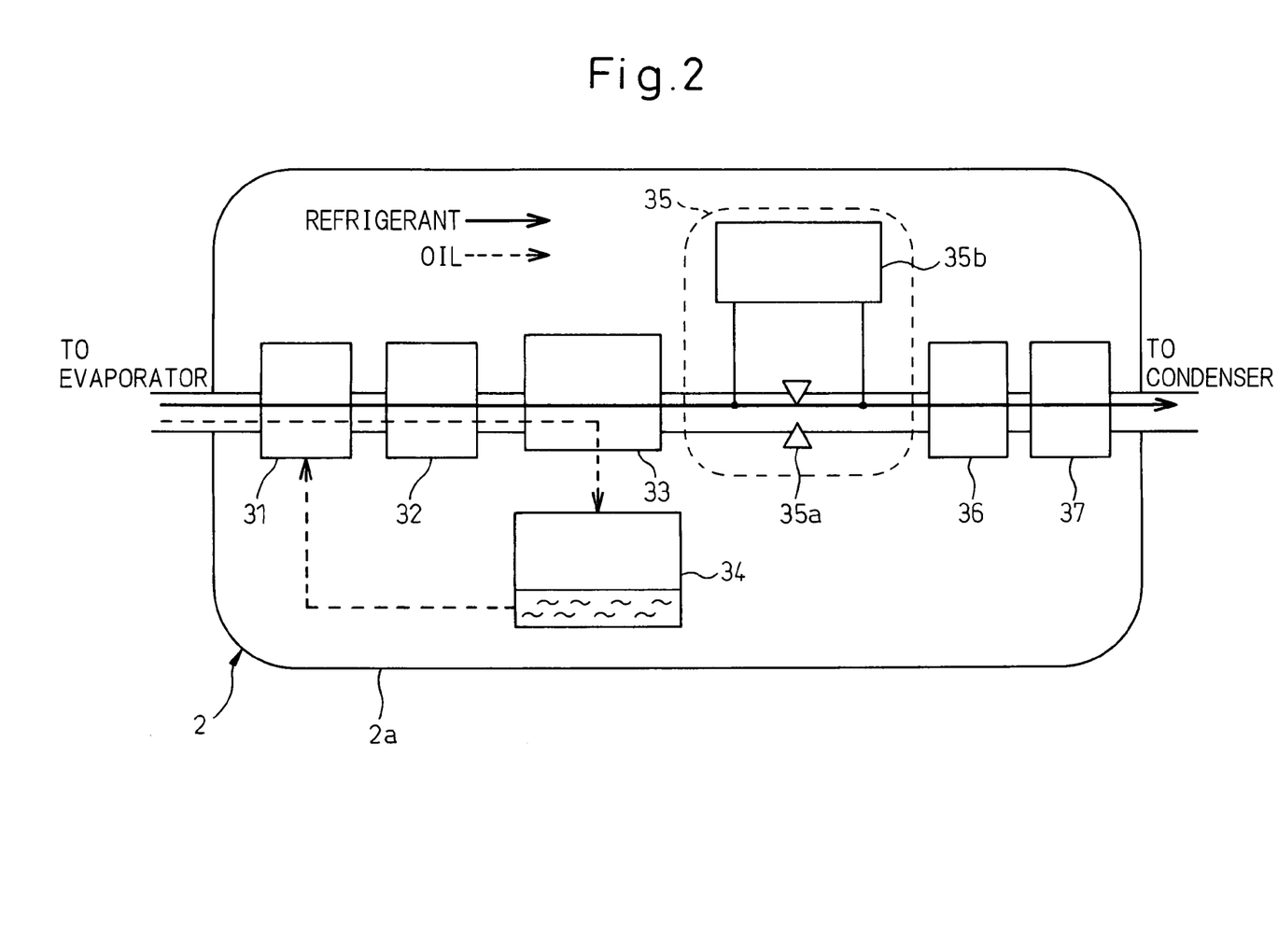
FIG. 2 is a diagram showing the internal configuration of the compressor shown in FIG. 1.

Next, the internal configuration of the compressor 2 according to this embodiment will be explained with reference to FIG. 2.

The housing 2a of the compressor 2 has an inlet 31 for taking in the refrigerant and an outlet 37 for discharging the refrigerant. A compression mechanism 32 is arranged in the housing 2a. The compression mechanism 32 compresses the refrigerant taken in through the inlet 31. An oil separator 33 separates the lubricating oil from the refrigerant compressed by the compression mechanism 32.

A flow rate sensor 35 (refrigerant flow rate sensor) is arranged on the downstream side of the oil separator 33. The flow rate sensor 35 is for detecting the flow rate of the refrigerant from which the lubricating oil is removed by the oil separator 33. The flow rate sensor 35 includes a throttle 35a for reducing the flow rate of the refrigerant supplied from the oil separator 33, and a pressure difference detection mechanism 35b for detecting the refrigerant pressure difference between the upstream and downstream sides of the throttle 35a in the refrigerant flow. The refrigerant that has passed through the flow rate sensor 35 is discharged from the outlet 37 through a check valve 36.

The electronic control unit 14 calculates the refrigerant flow rate based on the refrigerant pressure difference and the density of the discharged refrigerant (according to Bernoulli's law).

The high pressure and the refrigerant temperature are basically required to determine the density of the discharged refrigerant. However, in a certain high-pressure range where the pressure and the discharged refrigerant density can be specified in one-to-one relationship, and therefore the discharged refrigerant density can be specified only with the high pressure. Specifically, the refrigerant pressure difference, the high pressure and the discharged refrigerant flow rate are specified in one-to-one-to-one relationship.

According to this embodiment, the electronic control unit 14 includes a memory for storing a map indicating the relationship between the output (refrigerant pressure difference) of the flow rate sensor 35, the output (high pressure output) of the high pressure sensor 18 and the discharged refrigerant flow rate. The electronic control unit 14 determines the flow rate of the discharged refrigerant based on the map stored in the memory, the output of the flow rate sensor 35 and the output of the high pressure sensor 18.

Figure 3:
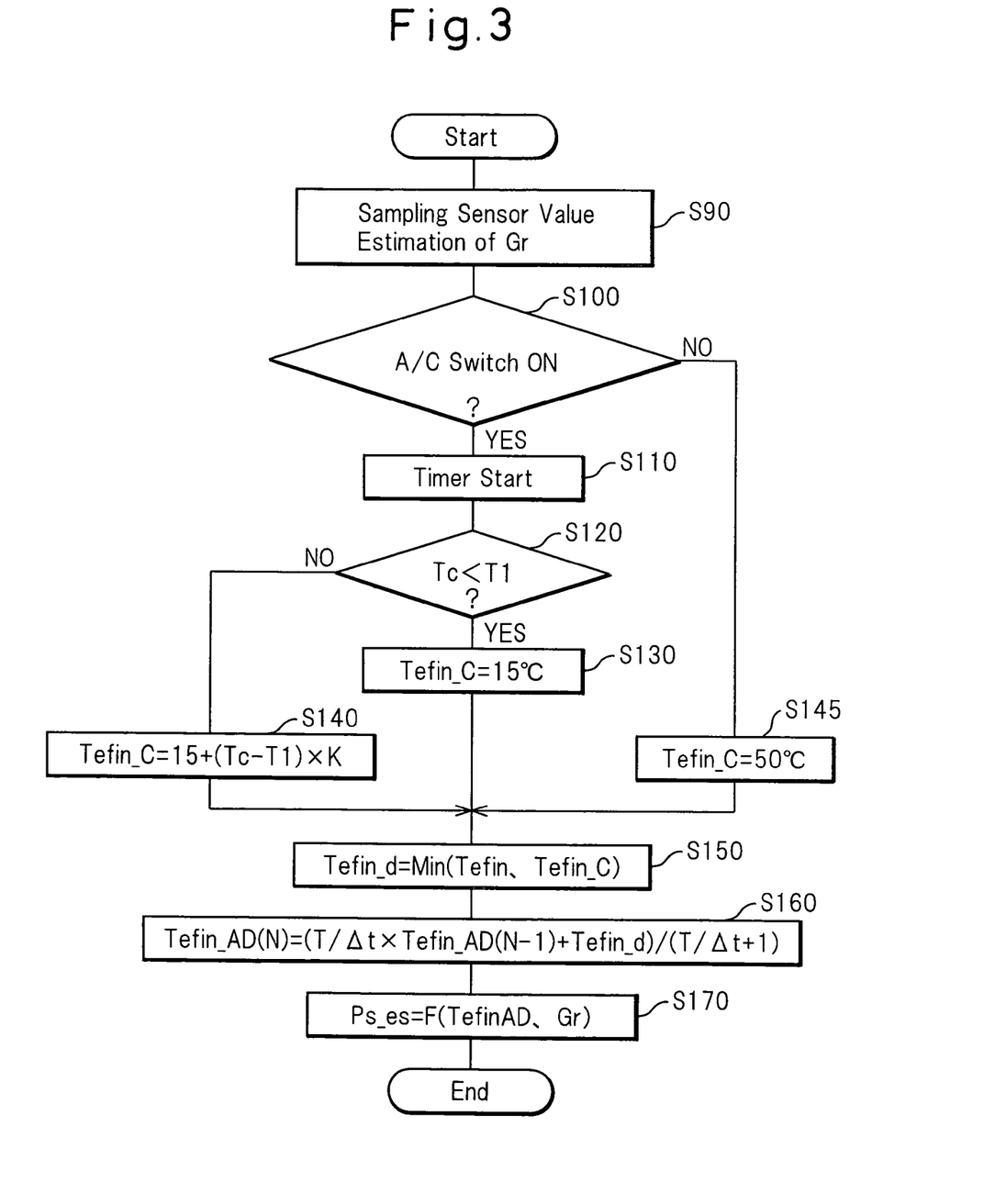
FIG. 3 is a flowchart showing the process of estimating the refrigerant inlet pressure by an electronic control unit shown in FIG. 1.

Next, the process executed by the electronic control unit 14 for estimating the refrigerant inlet pressure of the compressor 2 will be explained with reference to FIG. 3. FIG. 3 is a flowchart showing the process of estimating the refrigerant inlet pressure, and the ELECTRONIC CONTROL UNIT 14 executes the process of estimating the refrigerant inlet pressure in accordance with the flowchart of FIG. 3. Once an ignition switch IG is turned on, the execution of the process of estimating the refrigerant inlet pressure is started for each predetermined time period $\Delta t$.

First, in step S90, the detection temperature of the temperature sensor 13 and the detection value of the flow rate sensor 35 are sampled. In addition, the refrigerant flow rate is estimated based on the sampled detection value of the flow rate sensor 35. In the description that follows, the sampled value of the detection temperature of the temperature sensor 13 is designated as Tefin and an estimated refrigerant flow rate as Gr.

Next, step S100 judges whether the air-conditioning switch (A/C switch) is on or not, i.e. whether the command is issued to start the compressor 2 or not.

In the case where the air-conditioning switch is turned on, the start command for the compressor 2 is assumed to have been issued, and the answer YES is given. In this case, the control proceeds to step S110, and the timer is started to count.

After that, step S120 judges whether a predetermined time period T1 has elapsed or not after starting the counting of the timer. In the case where the timer count time Tc is shorter than the predetermined time period T1 (Tc<T1), the answer NO is given regarding that the predetermined time period T1 has not elapsed after the timer started counting.

In the process, Tefin_C is set to 15° C. in step S130. Tefin_C is a designated target of the refrigerant temperature estimated to reach after a predetermined time.

Tefin_C (estimated target temperature) or Tefin (the detection temperature of the temperature sensor 13) thus determined, whichever is lower, is determined as Tefin_d (step S150).

After that, step S160 determines Tefin_AD(N) by inputting Tefin_d into the first-order lag function of the following Equation (1).

$$\text{Tefin\_AD}(N) = (T/\Delta t \times \text{Tefin\_AD}(N-1) + \text{Tefin\_d})/(T/\Delta t + 1) \quad (1)$$

where N is the number of times the process of estimating the refrigerant inlet pressure is estimated, Tefin_AD(N) the estimated refrigerant temperature in the evaporator 6 to be calculated, Tefin_AD(N−1) the estimated refrigerant temperature in the evaporator 6 previously calculated, T the time, $\Delta t$ the period in which the refrigerant inlet pressure is estimated, and Tefin_d a parameter indicating the actually estimated target temperature of Tefin_AD(N) which has such a characteristic as to change toward Tefin_d.

After that, the control proceeds to step S170, where the estimated value Ps_es(N) of the refrigerant inlet pressure of the compressor 2 is determined using Tefin_AD(N) (the estimated refrigerant temperature in the evaporator 6) and Gr (the detected flow rate of the flow rate sensor 35).

Specifically, Tefin_AD(N) is substituted into Equation (2) below to determine the estimated refrigerant pressure Ps_Eba (n) in the evaporator 6.

$$Ps\_Eba(N) = 0.013 \times \text{Tefin\_AD}(N) - 0.16 \quad (2)$$

Next, Ps_Eba(N) is substituted into Equation (3) below to determine the estimated value Ps_es(N) of the refrigerant inlet pressure of the compressor 2.

$$Ps\_es(N) = Ps\_Eba(N) - (1.46/10^{\wedge}6)Gr \quad (3)$$

where "(1.46/10^6)Gr" indicates the pipe pressure loss between the evaporator 6 and the compressor 2, and by subtracting the pipe pressure loss from the estimated refrigerant pressure in the evaporator 6, the estimated refrigerant inlet pressure of the compressor 2 can be determined.

After that, the control is returned to step S90 to sample the detection temperature of the temperature sensor 13 and the detection value of the flow rate sensor 35. In addition, the refrigerant flow rate Gr is estimated based on the sampled detection value of the flow rate sensor 35.

Next, step S100 judges that the answer is YES in the case where the air-conditioning switch is on. In this case, the process of step S110 is passed, and step S120 judges whether the predetermined time period T1 has elapsed or not after the timer started counting.

In the case where the timer count time Tc is longer than the predetermined time period T1 (Tc>T1), the predetermined time period T1 is regarded to have elapsed after the timer started counting, and the answer YES is given.

In this case, step S140 determines Tefin_C by substituting the timer count time Tc into Equation (4) below thereby to determine Tefin_C.

$$\text{Tefin\_C} = 15 + (Tc - T1) \times K \quad (4)$$

where K is a coefficient. Equation (4) shows that once the timer count time Tc exceeds the predetermined time period T1, Tefin_C gradually increases from 15° C. with time.

Through the next steps S150 and S160, the estimated value Ps_es(N) of the refrigerant inlet pressure of the compressor 2 is determined in step S170.

After that, through the process of step S90, step S100 judges, if the air-conditioning switch (A/C switch) is off, that the answer is NO regarding that the start command for the compressor 2 is not issued. In other words, step S100 judges that the command not to start the compressor 2 is issued. In this case, step S145 sets Tefin_C at 50° C.

After that, through steps S150 and S160, step S170 determines the estimated value Ps_es(N) of the refrigerant inlet pressure of the compressor 2.

Figure 4:
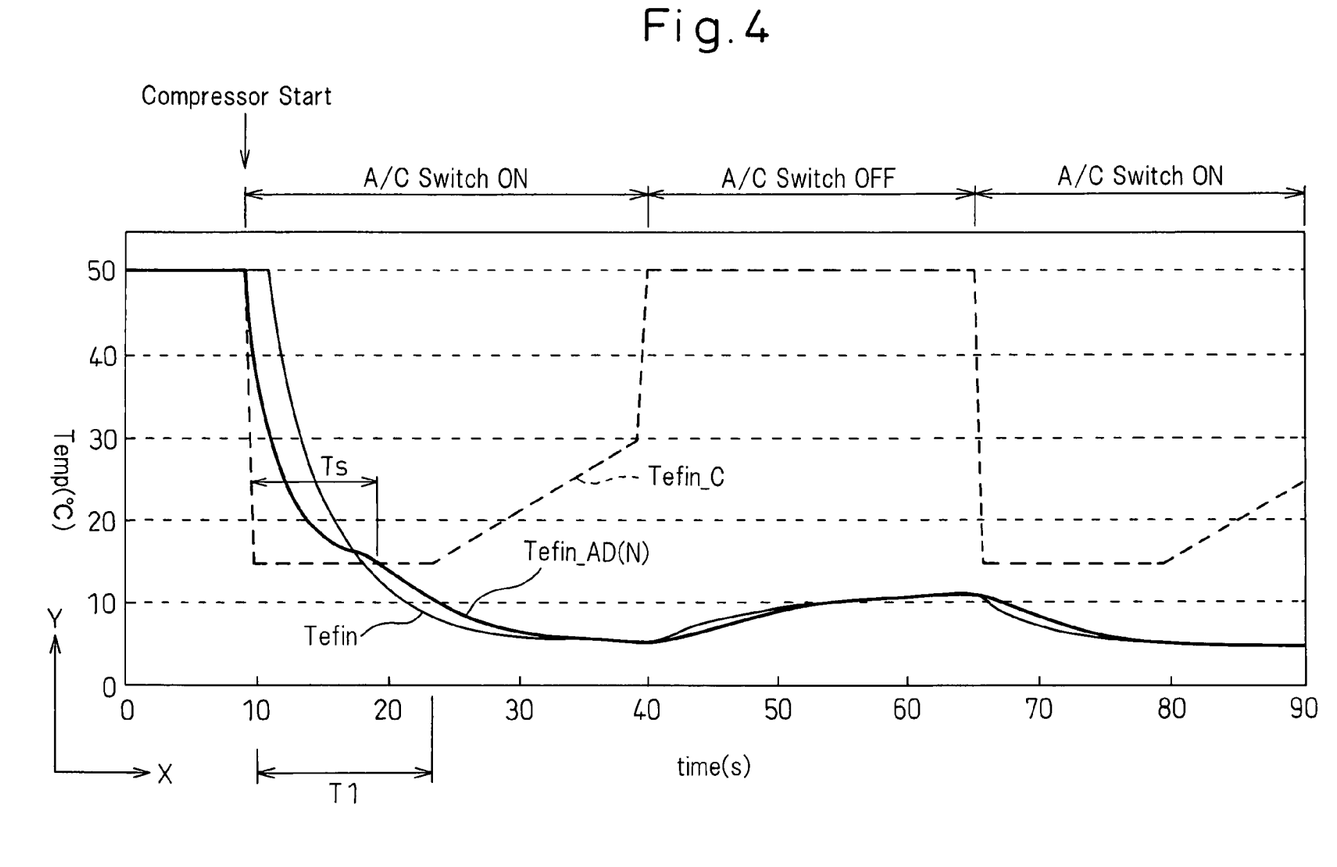
FIG. 4 is a diagram showing a specific example of the behavior of Tefin_AD(N), Tefin_C and Tefin according to the same embodiment.

In the graphs of FIGS. 4 and 5 with X axis (abscissa) representing the time and the Y axis (ordinate) the temperature, a specific example of the behavior of Tefin_AD(N), Tefin_C and Tefin is shown.

In FIGS. 4 and 5, with the turning on of the air-conditioning switch, Tefin gradually decreases with time, while with the turning off of the air-conditioning switch, Tefin gradually increases with time.

Tefin_C is kept at a constant temperature of 15° C. before the lapse of the predetermined time period T1 after turning on (activation) of the air-conditioning switch (step S130). Upon lapse of the predetermined time period T1 after turning on the air-conditioning switch, Tefin_C gradually increases with time (step S140), while once the air-conditioning switch is turned off, Tefin_C is kept at the constant temperature of 50° C. (step S145).

After turning on the compressor 2, assume that Tefin_C is lower than Tefin (Tefin_C<Tefin). In the X-Y coordinate system, Tefin_AD(N) is a function connecting, with a downwardly convex curve, Tefin (i.e. the surface temperature of the evaporator 6) at the time of starting the compressor 2 and the estimated target temperature Tefin_C upon lapse of a predetermined time Ts after staring the compressor 2.

The reason why Tefin_C is gradually increased with time upon lapse of the predetermined time period T1 after turning on the air-conditioning switch is to increase Tefin_AD(N) with time and change toward Tefin, as shown in FIG. 5, in order to select Tefin as Tefin_d in step S150 in the case where Tefin is higher than Tefin_C (Tefin_C<Tefin) upon lapse of the predetermined time period T1 after turning on the compressor 2.

Tefin is selected as Tefin_d because as described later, in the transient and subsequent states where the refrigerant temperature in the evaporator 6 sharply drops after starting the compressor 2, the detection value of the temperature sensor 13 lags less behind the actual refrigerant temperature (response lag).

FIG. 4 shows a case in which Tefin becomes lower than Tefin_C (Tefin_C>Tefin) for the predetermined time period T1 after turning on the compressor 2.

In this case, assume that Tefin is decreased below Tefin_C. Step S150 selects Tefin as Tefin_d, and therefore Tefin_AD (N) changes toward Tefin.

According to this embodiment described above, although the detection value of the temperature sensor 13 (thermistor) lags (response lag) behind the actual refrigerant temperature in the transient state where the refrigerant temperature in the evaporator 6 drops after starting the compressor 2, the estimated refrigerant temperature Tefin_AD(N) in the evaporator 6 is determined using the first-order lag function. Therefore, the refrigerant temperature in the evaporator 6 can be determined accurately without the lag of the detection value of the temperature sensor 13.

In addition, according to this embodiment, the estimated refrigerant pressure Ps_Eba(N) in the evaporator 6 and further, the estimated value Ps_es of the refrigerant inlet pressure of the compressor 2 are determined using Tefin_AD(N). As a result, the estimated value Ps_es can be determined accurately as the refrigerant inlet pressure of the compressor 2.

According to this embodiment, the estimated value of the refrigerant inlet pressure of the compressor 2 is determined by subtracting the pipe pressure loss ($(1.46/10^6)$Gr) from the estimated refrigerant pressure in the evaporator 6. Therefore, the estimated value Ps_es having a higher accuracy can be determined as the refrigerant inlet pressure of the compressor 2.

Further, in the transient state where the refrigerant temperature in the evaporator 6 sharply drops after starting the compressor 2, the detection value of the temperature sensor 13 lags behind the actual refrigerant temperature (response lag). Nevertheless, the lag of the detection value of the temperature sensor 13 is reduced in and after the transient state.

According to this embodiment, once the detection temperature of the temperature sensor 13 drops below Tefin_C, the estimated refrigerant temperature Tefin_AD(N) determined by the first-order lag function is set in proximity to the detection temperature of the temperature sensor 13, with the result that even after in and the transient phenomenon, the estimated refrigerant temperature Tefin_AD(N) can be determined accurately using the first-order lag function. At the same time, the estimated value Ps_es still higher in accuracy can be acquired.

Other Embodiments

The embodiment described above represents a case in which the first-order lag function is used to estimate the refrigerant temperature Tefin_AD(N) in the evaporator 6. However, the invention is not limited to this case, and any other function can be used with equal effect as long as the function is set as a downwardly convex curve, in the X-Y coordinate system with Y axis representing the refrigerant temperature in the evaporator 6 and X axis representing the time, in such a manner as to correct the response lag of the detection value of the temperature sensor 13 behind the refrigerant temperature in the evaporator 6 and reach Tefin_C upon lapse of the predetermined time Ts after starting the compressor 2.

The temperature Tefin_C, though set regardless of the thermal load (air-conditioning load) of the automotive air conditioning system in the embodiment described above, may alternatively be set at a higher value with the increase in the air-conditioning load (thermal load) of the automotive air conditioning system.

Specifically, Tefin_C may be set in accordance with the thermal load of the automotive air conditioning system as described below in (1) and (2).

(1) With an increase in the air temperature external to the passenger compartment detected by the external air temperature sensor (external air temperature detection means), Tefin_C is set at a higher value.

With the increase in the external air temperature while starting the compressor 2, the intake air temperature of the evaporator 6 increases, thereby increasing the refrigerant pressure and temperature in the evaporator 6.

In this case, by setting Tefin_C at a high value, Tefin_AD (N) can be rendered to approach the actual refrigerant temperature. As a result, the actual refrigerant temperature Tefin_AD(N) in the evaporator 6 can be estimated with higher accuracy.

(2) With the increase in the air capacity of the blower 12 as an air-conditioning load, Tefin_C is set at a higher value. This is due to the fact that an increased air capacity of the blower 12 increases the refrigerant temperature in the evaporator 6.

In this case, as in case (1), the value Tefin_AD(N) can be rendered to approach the actual refrigerant temperature in the evaporator 6 by setting Tefin_C at a high value. Thus, the actual refrigerant temperature Tefin_AD(N) in the evaporator 6 can be estimated with a high accuracy.

Tefin_C may alternatively be set in the manner described in (3) to (5) below.

(3) With the rise of the high pressure detected by the high-pressure sensor 18 (i.e. the rise in the refrigerant pressure between the refrigerant outlet of the compressor 2 and the refrigerant inlet of the expansion valve 5 in the refrigeration cycle system 1), Tefin_C is set at a higher value. In the case where the high pressure detected by the high-pressure sensor 18 is high, the external air temperature tends to be high, which in turn is considered to mean that the same state as (1) described above prevails.

(4) The higher the detection temperature Tefin of the temperature sensor 13 used in the previous calculation of the estimated refrigerant temperature Tefin_AD(N−1), the higher the value of Tefin_C allowed to use in the next calculation of Tefin_AD(N).

The higher the detection temperature Tefin of the temperature sensor 13 used in the calculation of Tefin_AD(N−1) at the time of starting the compressor 2, for example, Tefin_C used for the next calculation of Tefin_AD(N) may be set to a higher value.

(5) The higher the previously estimated refrigerant temperature Tefin_AD(N−1), Tefin_C used for the next calculation of the estimated refrigerant temperature Tefin_AD(N) may be set to a higher value.

The higher the value Tefin_AD(N−1) calculated at the time of starting the compressor 2, for example, Tefin_C used for the next calculation of Tefin_AD(N) may be set to a higher value.

The embodiments described above deal with a case in which the electronic control unit 14 for the air conditioning system estimates the refrigerant inlet pressure of the compressor 2. However, this invention is not limited to such a case, and the refrigerant inlet pressure of the compressor 2 may alternatively be estimated by the electronic control unit for controlling the engine, or a part of the process of estimating the refrigerant inlet pressure of the compressor 2 may be executed the electronic control unit 14 for the air conditioning system and the remaining part by the electronic control unit for controlling the engine.

The embodiments described above represent a case in which the temperature sensor for detecting the temperature of the blown air immediately after passing through the evaporator 6 is used as "the temperature sensor 13 for detecting the surface temperature of the evaporator 6". As an alternative, the temperature sensor 13 may detect the outer surface temperature of the evaporator 6.

In the embodiments described above, the refrigeration cycle system according to the invention is used for the automotive air conditioning system. However, the invention is not limited to this case, and the refrigeration cycle system according to the invention is also applicable to the air-conditioning equipment of fixed type, the water heater of heat pump type and various other apparatuses with equal effect.

The correspondence between the embodiments described above and the scope of the appended claims will be explained. The condenser 3 corresponds to the cooler, and the expansion valve 5 to the decompressor. The control process of step S160 corresponds to "the refrigerant temperature estimation means for estimating the refrigerant temperature in the evaporator based on the function set according to the detection temperature of the temperature sensor", and the control process of step S170 to "the pressure estimation means for estimating the refrigerant inlet pressure of the compressor based on the refrigerant temperature estimated by the refrigerant temperature estimation means".

While the invention has been described by reference to specific embodiments chosen for purposes of illustration, it should be apparent that numerous modifications could be made thereto by those skilled in the art without departing from the basic concept and scope of the invention.

The invention claimed is:

1. A compressor inlet pressure estimation apparatus for a refrigeration cycle system, the refrigeration cycle system comprising:
 a compressor for sucking, compressing and discharging a refrigerant;
 a cooler for cooling the refrigerant discharged from the compressor;
 a decompressor for reducing the pressure of the refrigerant cooled by the cooler;
 an evaporator for evaporating the refrigerant, which is reduced in pressure by the decompressor, by absorbing heat from air,
 the compressor inlet pressure estimation apparatus comprising:
 a temperature sensor for detecting the surface temperature of the evaporator;
 a refrigerant temperature estimation means estimating the refrigerant temperature in the evaporator upon lapse of a certain time after starting the compressor based on a function indicating a relationship between an estimated temperature in the evaporator and time; and
 a pressure estimation means estimating the refrigerant inlet pressure of the compressor based on the refrigerant temperature estimated by the refrigerant temperature estimation means;
 wherein the function connects, with a downwardly convex curve, the surface temperature of the evaporator detected by the temperature sensor at the time of starting the compressor and an estimated target temperature constituting the refrigerant temperature upon lapse of a predetermined time after starting the compressor, on an X-Y coordinate system with Y axis representing the estimated refrigerant temperature in the evaporator and X axis representing the time,
 wherein the estimated target temperature is a variable having a value that increases with time after a predetermined time period from the starting of the compressor elapses, and
 wherein the estimated refrigerant temperature in the evaporator is determined based on the estimated target temperature or the surface temperature of the evaporator detected by the temperature sensor, whichever is lower.

2. The compressor inlet pressure estimation apparatus for the refrigeration cycle system according to claim 1,
 wherein the function is a first-order lag function, the first-order function being set to connect the surface temperature of the evaporator detected by the temperature sensor at the time of starting the compressor and the estimated target temperature with the curve on the X-Y coordinate system.

3. The compressor inlet pressure estimation apparatus for the refrigeration cycle system according to claim 1,
 wherein the function is set in such a manner that upon lapse of a predetermined time after starting the compressor, the estimated target temperature increases with time.

4. The compressor inlet pressure estimation apparatus for the refrigeration cycle system according to claim 1, further comprising a refrigerant flow rate sensor for detecting the flow rate of the refrigerant flowing between the evaporator and the compressor,
 wherein the pressure estimation means estimates the refrigerant pressure in the evaporator based on the refrigerant temperature estimated by the refrigerant temperature estimation means, estimates the pressure loss between the evaporator and the compressor based on the flow rate detected by the refrigerant flow rate sensor, and estimates the refrigerant inlet pressure of the compressor by subtracting the estimated pressure loss from the estimated refrigerant pressure in the evaporator.

5. The compressor inlet pressure estimation apparatus for the refrigeration cycle system according to claim 1,
wherein the evaporator makes up an air conditioning system for air-conditioning a room, and
wherein with the increase in the thermal load of the air conditioning system, the estimated target temperature is set to a higher value.

6. The compressor inlet pressure estimation apparatus for the refrigeration cycle system according to claim 5, further comprising an external temperature detection means for detecting the air temperature outside the room,
wherein with the increase in the air temperature outside the room, the estimated target temperature of the refrigerant temperature is set to a higher value.

7. The compressor inlet pressure estimation apparatus for the refrigeration cycle system according to claim 5,
wherein the evaporator makes up the air conditioning system with a blower for blowing the air toward the evaporator, and
wherein with the increase in the air capacity of the blower, the estimated target temperature is set to a higher value.

8. The compressor inlet pressure estimation apparatus for the refrigeration cycle system according to claim 5,
wherein with the increase in the refrigerant pressure on high pressure side between the refrigerant outlet of the compressor and the refrigerant inlet of the decompressor, the estimated target temperature is set to a higher value.

9. The compressor inlet pressure estimation apparatus for the refrigeration cycle system according to claim 1,
wherein the refrigerant temperature estimation means repeatedly estimates the refrigerant temperature in the evaporator.

10. The compressor inlet pressure estimation apparatus for the refrigeration cycle system according to claim 9,
wherein the higher the temperature detected by the temperature sensor used for the previous estimation of the refrigerant temperature by the refrigerant temperature estimation means, the higher the setting of the estimated target temperature used for the present estimation of the refrigerant temperature by the refrigerant temperature estimation means.

11. The compressor inlet pressure estimation apparatus for the refrigeration cycle system according to claim 9,
wherein the higher the refrigerant temperature previously estimated by the refrigerant temperature estimation means, the higher the setting of the estimated target temperature used for the present estimation of the refrigerant temperature by the refrigerant temperature estimation means.

* * * * *